US009294284B1

(12) United States Patent
Mao (10) Patent No.: US 9,294,284 B1
(45) Date of Patent: Mar. 22, 2016

(54) SYSTEMS AND METHODS FOR VALIDATING APPLICATION SIGNATURES

(71) Applicant: Symantec Corporation, Mountain View, CA (US)

(72) Inventor: Jun Mao, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 270 days.

(21) Appl. No.: 14/020,319

(22) Filed: Sep. 6, 2013

(51) Int. Cl.
*G06F 21/00* (2013.01)
*H04L 9/32* (2006.01)
*G06F 21/10* (2013.01)
*G06F 21/44* (2013.01)

(52) U.S. Cl.
CPC .............. *H04L 9/3247* (2013.01); *G06F 21/10* (2013.01); *G06F 21/105* (2013.01); *G06F 21/44* (2013.01)

(58) Field of Classification Search
CPC ....... G06F 21/10; G06F 21/105; G06F 21/12; G06F 21/16; G06F 21/44; G06F 21/45
See application file for complete search history.

(56) References Cited

U.S. PATENT DOCUMENTS

| 2007/0038853 A1 | 2/2007 | Day et al. |
| 2009/0089290 A1* | 4/2009 | Nachenberg et al. ............. 707/9 |
| 2012/0198543 A1* | 8/2012 | Rogers et al. .................. 726/17 |
| 2014/0373097 A1 | 12/2014 | Thayer et al. |

OTHER PUBLICATIONS

Anubhav Savant; Systems and Methods for Validating Self-Signed Certificates; U.S. Appl. No. 14/024,638, filed Sep. 12, 2013.
"Trialware: Symantec Mobile Security 7.2", https://www4.symantec.com/Vrt/offer?a_id=141355, as accessed Jun. 29, 2013, Symantec Corporation, (Jun. 9, 2013).
"Lookout", https://www.lookout.com/, as accessed Jun. 29, 2013, (Jan. 2, 1997).
"Trend Micro", http://www.trendmicro.com/us/index.html, as accessed Jun. 29, 2015, (Jan. 23, 2012).
"McAfee", http://www.mcafee.com/us/, as accessed Jun. 29, 2015, (Feb. 29, 2000).

* cited by examiner

Primary Examiner — Edward Zee
(74) Attorney, Agent, or Firm — ALG Intellectual Property, LLC (57) ABSTRACT

A computer-implemented method for validating application signatures may include maintaining a signature-validation database that associates application publishers with signature keys by, for each application in a set of applications, (1) identifying a key used to sign the application, (2) determining that the application claims to be provided by a publisher, (3) verifying that the claimed publisher provides the application, and (4) maintaining, in response to verifying that the claimed publisher provides the application, an association that indicates that the publisher of the application is authorized to use the key. Various other methods, systems, and computer-readable media are also disclosed.

20 Claims, 8 Drawing Sheets

FIG. 8

SYSTEMS AND METHODS FOR VALIDATING APPLICATION SIGNATURES

BACKGROUND

In the early days of computing, new applications were installed via physical disks and it was difficult for a malicious agent to impersonate a legitimate developer. Now, applications are downloaded from the Internet from a wide variety of servers, websites, and application stores. Fraudulent websites and malicious developers can easily mimic legitimate applications, causing users to download malicious applications and posing a great risk to the security of users, systems, and enterprises. Digital signatures are one of the ways in which users can ensure that the application they are downloading is from a legitimate, trusted developer rather than a potentially malicious imposter.

Unfortunately, the trustworthiness of a digital signature is directly related to the security of the private key used to create the digital signature. If a private key has been compromised, then malicious agents can impersonate the key's signatory even more effectively. Traditional systems for verifying digital signatures may lack mechanisms for determining if a private key used for a digital signature is legitimately associated with a developer of an application signed with the private key. Accordingly, the instant disclosure identifies and addresses a need for additional and improved systems and methods for validating application signatures.

SUMMARY

As will be described in greater detail below, the instant disclosure generally relates to systems and methods for validating application signatures. In one example, a computer-implemented method for validating application signatures may include maintaining a signature-validation database that associates application publishers with signature keys by, for each application in a set of applications, (1) identifying a key used to sign the application, (2) determining that the application claims to be provided by a publisher, (3) verifying that the claimed publisher provides the application, and (4) maintaining, in response to verifying that the claimed publisher provides the application, an association that indicates that the publisher of the application is authorized to use the key.

In one embodiment, the computer-implemented method may further include (1) identifying an application that has a signature that has not been verified, (2) determining that the unverified application claims to be provided by a particular publisher, (3) querying the signature-validation database to determine whether the particular publisher claimed by the unverified application is associated with a key used to sign the unverified application, (4) determining, based on a response from the signature-validation database, that the particular publisher is not associated with the key used to sign the unverified application, and (5) concluding, based on the determination that the particular publisher is not associated with the key used to sign the unverified application, that the signature of the unverified application is not legitimate.

In some examples, the computer-implemented method may further include, upon concluding that the signature of the unverified application is not legitimate, performing a security action. According to various embodiments, identifying a key used to sign the application may include identifying a digital signature that was created with the key.

In some examples, determining that the application claims to be provided by a publisher may include determining that the application appears to claim a domain name owned by the publisher. In these examples, determining that the application appears to claim the domain name may include identifying the domain name within the application.

Verifying that the claimed publisher provides the application may be done in a number of ways. In some examples, verifying that the claimed publisher provides the application may include determining that the application is available for download from the publisher. Additionally or alternatively, verifying that the claimed publisher provides the application may include determining, based on reputation data of the application that indicates that the application is trusted, that the application is legitimately from the claimed publisher.

In some examples, maintaining an association that indicates that the publisher of the application is authorized to use the key may include maintaining an association between a certificate created by the key and the publisher.

In one embodiment, a system for implementing the above-described method may include (1) an identification module that identifies a key used to sign an application, (2) a determination module that determines that the application claims to be provided by a publisher, (3) a verification module that verifies that the claimed publisher provides the application, (4) an association module that creates, in response to verifying that the claimed publisher provides the application, an association that indicates that the publisher of the application is authorized to use the key, (5) a signature-validation database that stores the association between the publisher of the application and the key, and (6) at least one processor configured to execute the identification module, the determination module, the verification module, and the association module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to maintain a signature-validation database that associates application publishers with signature keys by, for each application in a set of applications, (1) identifying a key used to sign the application, (2) determining that the application claims to be provided by a publisher, (3) verifying that the claimed publisher provides the application, and (4) in response to verifying that the claimed publisher provides the application, maintaining an association that indicates that the publisher of the application is authorized to use the key.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for validating application signatures. As will be explained in greater detail below, by storing associations between keys, applications, and publishers, the systems described herein may quickly determine if a new application that claims to be owned by a specific publisher is legitimately signed by a valid key belonging to that publisher. Validating signatures in this way may help detect potentially malicious imposter applications.

Figure 1:
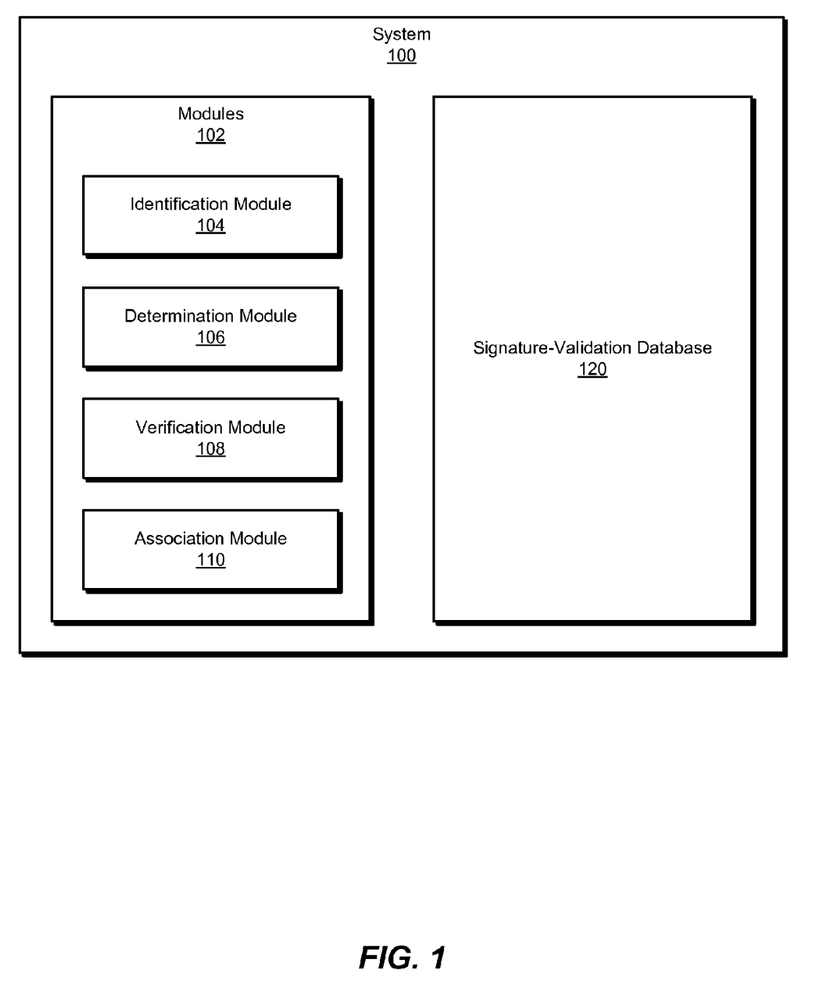
FIG. 1 is a block diagram of an exemplary system for validating application signatures.
Figure 2:
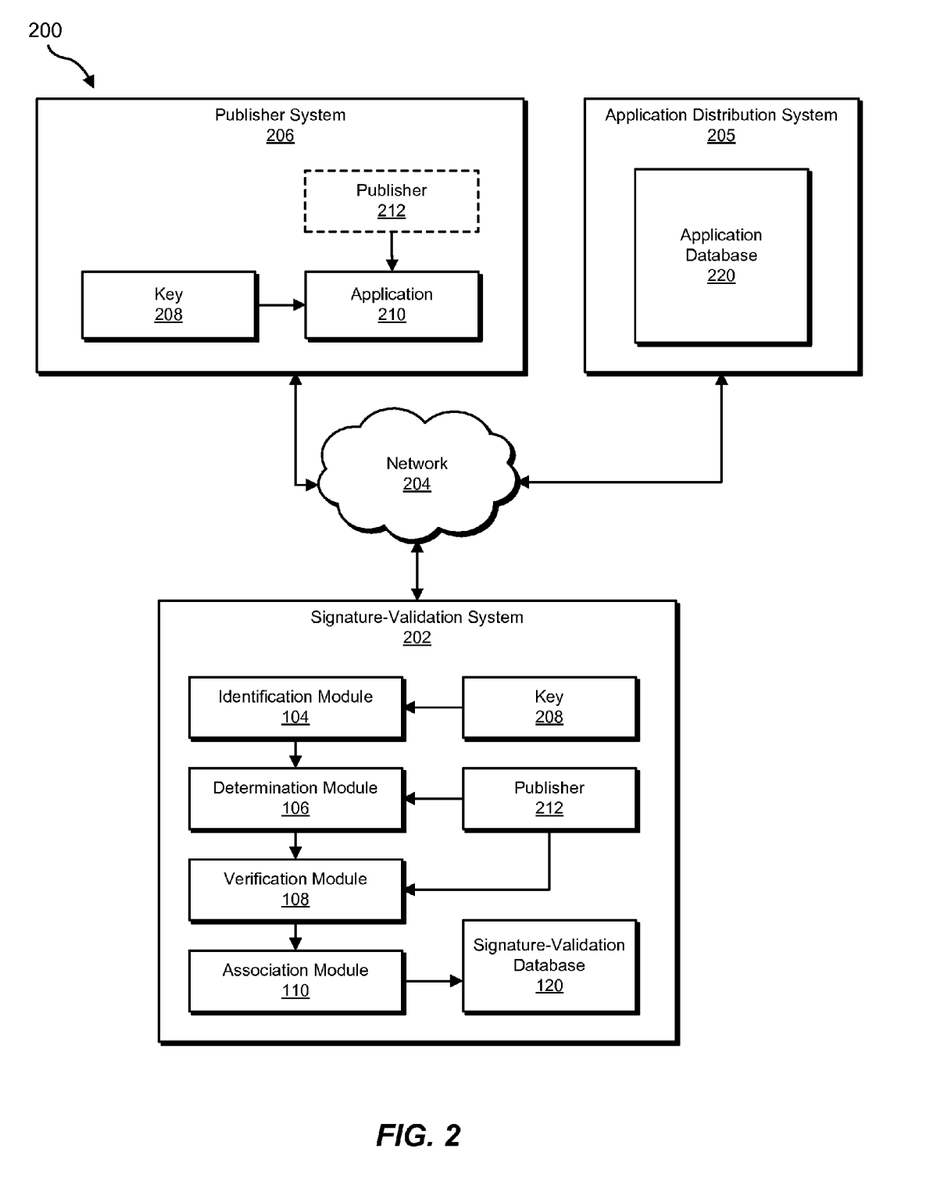
FIG. 2 is a block diagram of an exemplary system for validating application signatures implemented in a network environment.
Figure 4:
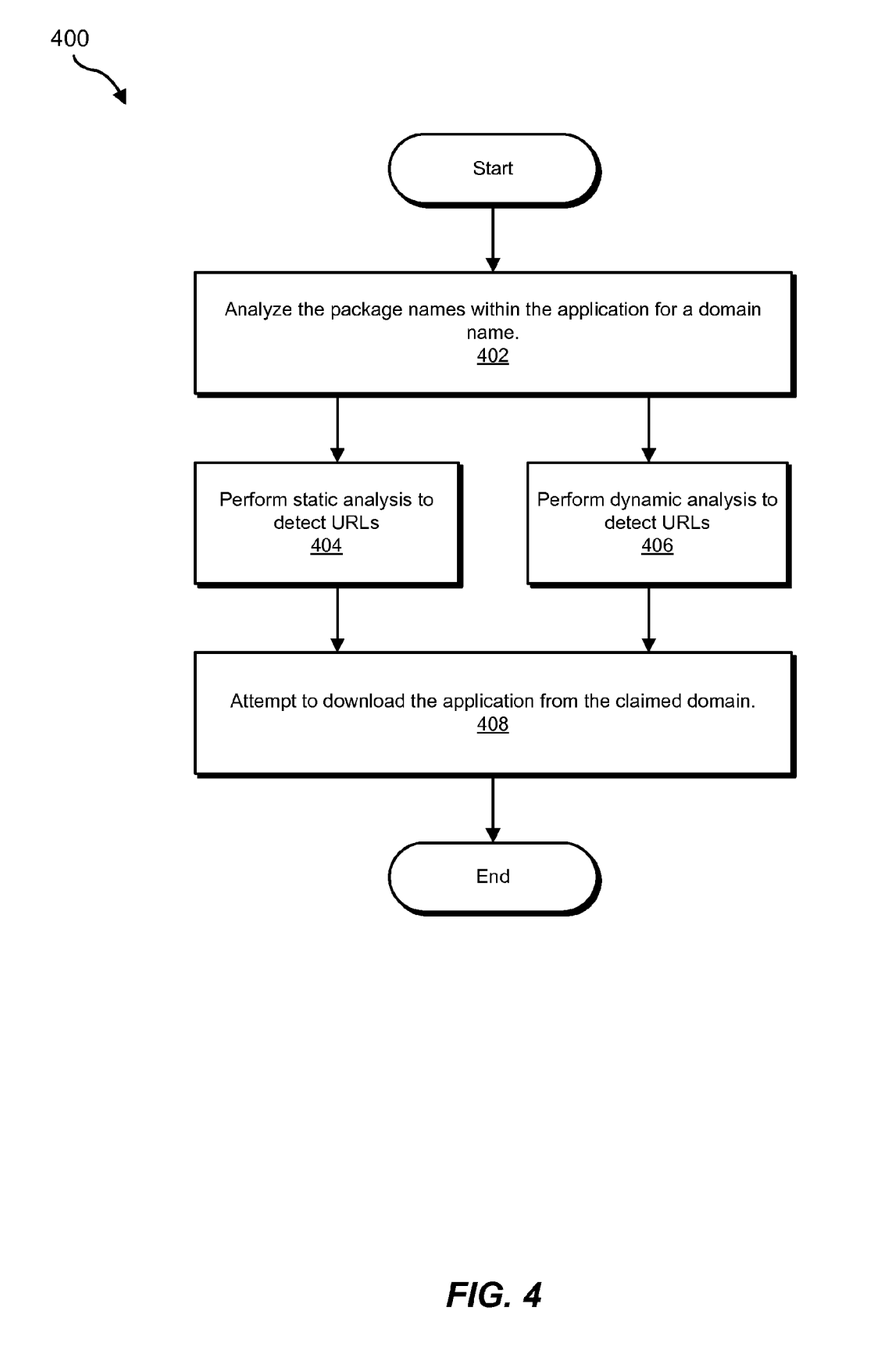
FIG. 4 is a flow diagram of an exemplary method for validating application signatures using a domain name claimed by an application.
Figure 5:
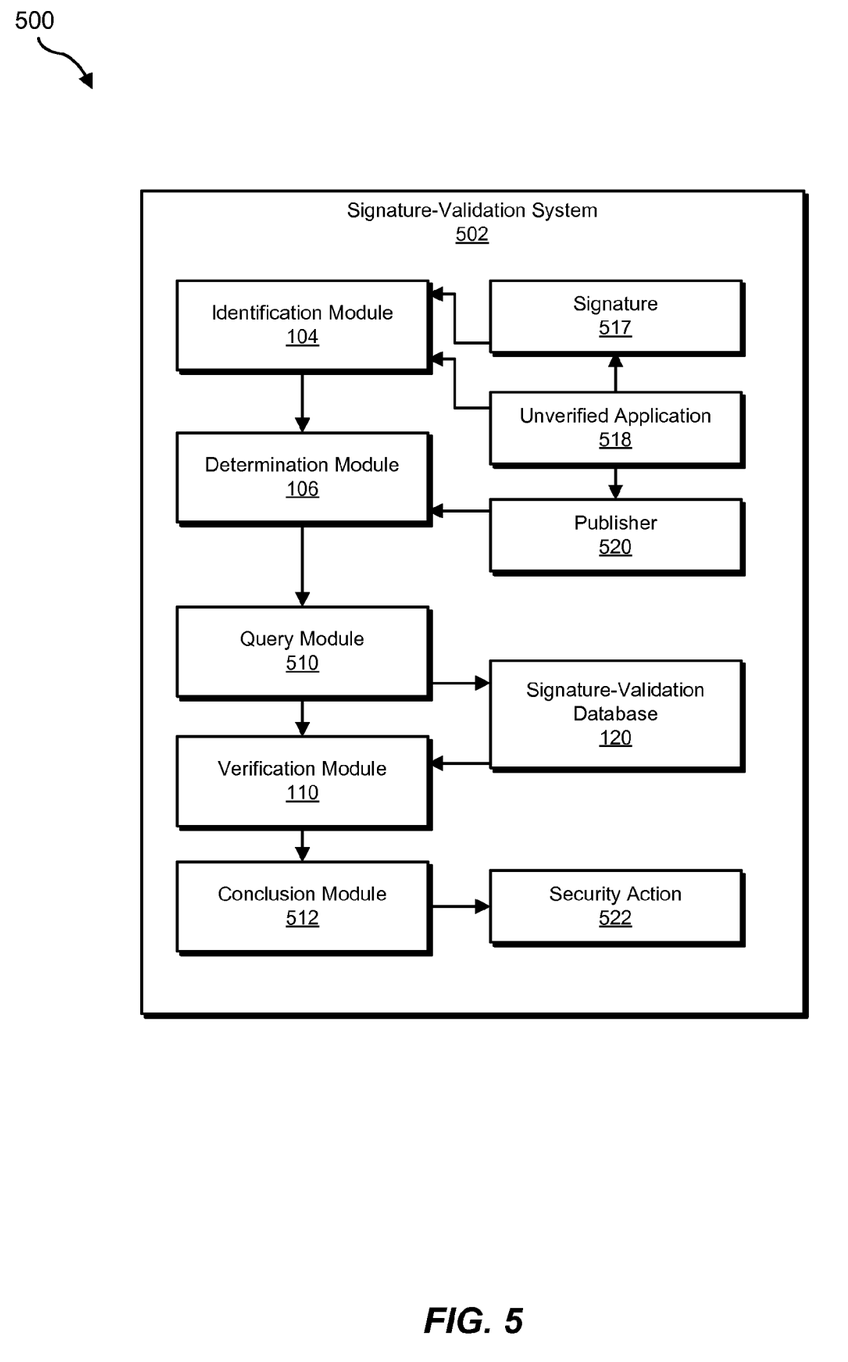
FIG. 5 is a block diagram of an exemplary system for performing security actions in response to determining whether an application signature is valid.

The following will provide, with reference to FIGS. 1-2 and 5, detailed descriptions of exemplary systems for validating application signatures. Detailed descriptions of corresponding computer-implemented methods will also be provided in connection with FIGS. 3, 4, and 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for validating application signatures. As illustrated in this figure, exemplary system 100 may include one or more modules 102 for performing one or more tasks. For example, and as will be explained in greater detail below, exemplary system 100 may include an identification module 104 that may identify a key used to sign an application. Exemplary system 100 may also include a determination module 106 that may determine that the application claims to be provided by a publisher. Exemplary system 100 may additionally include a verification module 108 that may verify that the claimed publisher provides the application. Exemplary system 100 may also include an association module 110 that creates, in response to verifying that the claimed publisher provides the application, an association in signature-validation database 120 that indicates that the publisher of the application is authorized to use the key. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2, signature-validation system 202, computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as signature-validation database 120. In one example, signature-validation database 120 may be configured to store associations between applications, publishers, and/or keys.

Signature-validation database 120 may represent portions of a single database or computing device or a plurality of databases or computing devices. For example, signature-validation database 120 may represent a portion of publisher system 206 in FIG. 2, computing system 710 in FIG. 7, and/or portions of exemplary network architecture 800 in FIG. 8. Alternatively, signature-validation database 120 in FIG. 1 may represent one or more physically separate devices capable of being accessed by a computing device, such as publisher system 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a signature-validation system 202 in communication with an application distribution system 205 over a network 204.

Signature-validation system 202 generally represents any type or form of server or other computing device capable validating signatures, and may include any type or form of server or other computing device. Signature-validation system 202 may be provided by a third-party entity that validates application signatures (e.g., a security software company). Alternatively, signature-validation system 202 may be managed by an entity that provides an application distribution system. In such examples, application distribution system 205 may be part of the same system or on the same local network as signature-validation system 202.

Application distribution system 205 generally represents any type or form of server or other computing device that receives and distributes applications on behalf of application publishers. Application distribution system 205 may distribute applications for any type of platform, including MAC OS, IOS, ANDROID, WINDOWS, WINDOWS PHONE, etc. For example, application distribution system 205 may include a mobile application marketplace, such as the IOS APP STORE provided by APPLE, the GOOGLE PLAY application distribution system, the WINDOWS STORE provided my MICROSOFT, and/or any other type or form of mobile application distribution system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like.

Network 204 may facilitate communication or data transfer using wireless or wired connections. In one embodiment, network 204 may facilitate communication between signature-validation system 202 and publisher system 206.

Application distribution system 205 may include applications from various publishers. For example, application distribution system 205 may receive an application 210 from a publisher system 206. Publisher system 206 generally represents a system used by a publisher to publish applications. As shown in FIG. 2, publisher system 206 may sign application 210 with a key 208. Publisher system 206 may then provide application 210 to application distribution system 205 for redistribution, and application distribution system 205 may store application 210 in application database 220.

In the example shown in FIG. 2, signature-validation system 202 may validate one or more applications from application distribution system 205. Additionally or alternatively, signature-validation system 202 may validate applications received from any other source and/or identified in any other manner.

Signature-validation system 202 may be programmed with one or more of modules 102 and/or may store all or a portion of the data in signature-validation database 120. In one embodiment, one or more of modules 102 from FIG. 1 may, when executed by at least one processor of signature-validation system 202, enable signature-validation system 202 to validate application signatures. For example, and as will be described in greater detail below, one or more of modules 102 may be programmed to maintain, on signature-validation system 202, signature-validation database 120, which may store validation information for one or more of the applications in application database 220.

Modules 102 may add entries to signature-validation database 120 by performing one or more of a variety of steps. The following example shows how an entry in signature-validation database 120 is created for application 210. In this example, identification module 104 may identify a key 208 used to sign application 210. Determination module 106 may determine that application 210 claims to be provided by publisher 212. Verification module 108 may be programmed to verify that publisher 212 provides application 210. Association module 110 may, in response to verifying that publisher 212 provides application 210, create an association in signature-validation database 120 that indicates that publisher 212 of application 210 is authorized to use key 208.

Figure 3:
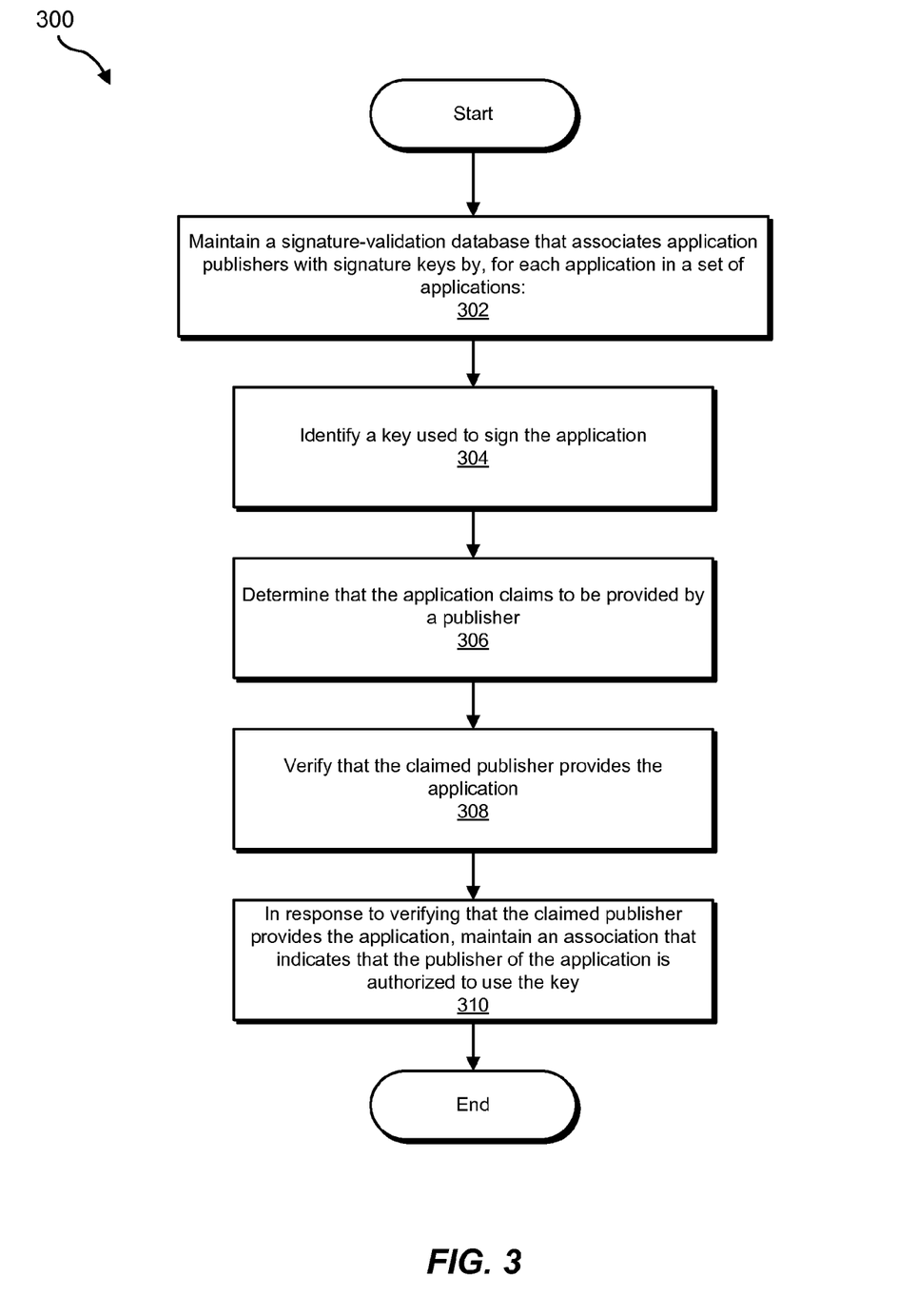
FIG. 3 is a flow diagram of an exemplary method for validating application signatures.

FIG. 3 is a flow diagram of an exemplary computer-implemented method 300 for validating application signatures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may maintain a signature-validation database that associates application publishers with signature keys for each application in a set of applications. For example, at step 302 association module 110 may, as part of signature-validation system 202 in FIG. 2, maintain signature-validation database 120 that associates application publishers with signature keys.

The term "key" or phrase "signature key," as used herein, generally refer to any information that may be used to uniquely identify the publisher of an application. In some embodiments, a key may be the non-public half of an asymmetric key pair that may be used to digitally sign files and/or applications. A private key may be used to digitally sign a file and the digital signature may then be authenticated by using the public key. Authentication of the digital signature verifies that the file was signed by the private key and has not been tampered with. For example, a developer may sign an application with a private key, and a user may authenticate the digital signature of the application in order to verify that the application was signed by the developer and is not an imposter. If a malicious actor gains access to a private key used by a legitimate developer, the malicious actor may use the private key to digitally sign harmful applications such that the harmful applications appear to systems and users to originate from the legitimate developer.

The term "publisher," as used herein, generally refers to any entity that has published, signed, and/or otherwise provided at least one application. A publisher may be an individual, a group, and/or a corporation. A publisher may be the signatory for one or several private keys, but a given private key may only have one publisher as a signatory. Examples of publishers may include, without limitation, GOOGLE, APPLE, SYMANTEC, and/or MICROSOFT.

The phrase "set of applications," as used herein, generally refers to any group of one or more applications. For example, a set of applications may include some or all applications in application database 220 on application distribution system 205.

Maintaining a signature-validation database (step 302) may involve performing one or more of steps 304, 306, 308 and/or 310. For example, a security system may maintain a signature-validation database that associates application publishers with private keys by identifying keys used to sign applications, verifying the claimed publishers of the applications, and maintaining associations between the publishers, keys, and/or applications.

At step 304 one or more of the systems described herein may identify a key used to sign an application. For example, at step 304 identification module 104 may, as part of signature-validation system 202 in FIG. 2, identify key 208 used to sign application 210.

Systems described herein may identify a key used to sign an application in a variety of ways and/or contexts. For example, identification module 104 may identify a private key used to sign a mobile application. In one example, identification module 104 may identify a private key used to sign the mobile application "Irate Avians."

In some embodiments, identification module 104 may identify a key used to sign an application by identifying a digital signature or certificate that was created with the key. Additionally or alternatively, systems described herein may use the digital signature of the application identified by identification module 104 to identify the key. In some embodiments, identification module 104 may determine that an identified signature implies use of a particular key without explicitly identifying the key itself.

At step 306 one or more of the systems described herein may determine that the application claims to be provided by a publisher. For example, at step 306 determination module 106 may, as part of signature-validation system 202 in FIG. 2, determine that application 210 claims to be provided by publisher 212.

Systems described herein may determine that an application claims to be provided by a publisher in various ways. In some embodiments, determination module 106 may determine that an application claims to be provided by a publisher by determining that the application appears to claim a domain name owned by the publisher. Determination module 106 may determine that an application appears to claim a domain name by identifying a domain name within the application, as discussed in greater detail below. Determination module 106 may additionally or alternatively use any other type or form of information or analysis to determine that an application claims to be from a particular publisher.

In some embodiments, determination module 106 may determine that a mobile application claims to be provided by a mobile application publisher. In one example, determination module 106 may determine that the application Irate Avians is provided by the publisher Orivo.

Returning to FIG. 3, at step 308 one or more of the systems described herein may verify that a claimed publisher provides the application that claims the publisher. For example, at step 308 verification module 108 may, as part of signature-validation system 202 in FIG. 2, verify that publisher 212 provides application 210.

Systems described herein may verify that a publisher provides an application in any or all of a variety of ways. In some examples, verification module 108 may verify that the claimed publisher provides the application by determining that the application is available for download from the publisher. Determining that the application is available for download from the publisher may include, without limitation, identifying the application in at least one application store under the publisher's account and/or locating the application on the publisher's website. In one example, verification module 108 may verify that Orivo provides Irate Avians by identifying Irate Avians in the GOOGLE PLAY application store under Orivo's publisher account.

In various embodiments, verification module 108 may verify that a mobile application publisher provides a mobile application by identifying the mobile application in a trusted application store. In one example, verification module 108 may verify that the publisher Orivo provides the application Irate Avians by downloading the Irate Avians application from the official Orivo website.

In some embodiments, verification module 108 may verify that an application is available for download from a publisher by locating the domain name of the publisher in packages used by the application. By convention, many organizations use their domain name in reverse order as the prefix to the names of packages within their applications. For example, the application Irate Avians may include a package with the name "com.orivo.game." In this example, the publisher of Irate Avians may be Orivo.

In some examples, verification module 108 may verify that the claimed publisher provides the application by determining, based on reputation data of the application that indicates that the application is trusted, that the application is legitimate. Reputation data may include user reviews, user ratings, download counts, anti-virus signatures, number of installations on trusted devices, and/or average time between installation and uninstallation. An application with highly positive reputation data is unlikely to be a malicious imposter and thus may be assumed to be legitimately associated with the claimed publisher of the application.

Verification module 108 may also attempt to correlate data about an application with previously collected data about a publisher domain name claimed by the application. In some embodiments, verification module 108 may determine that a key used to sign the application is the same as the key used to sign several other applications claiming the same domain. If the domain claimed by the application is the domain most commonly claimed by applications that are signed with the key, verification module 108 may conclude that the application's claim to the domain is valid. For example, validation module 108 may determine that the key used to sign SYMANTEC MOBILE SECURITY was also used to sign several other applications with the claimed domain of "SYMANTEC.COM," and therefore SYMANTEC MOBILE SECURITY has a legitimate signature. As used herein, the terms "domain" and "domain name" generally refer to domain-name system information that identifies or is associated with a particular entity (e.g., publisher).

FIG. 4 is a flow diagram of an exemplary method 400 for using domain name information for determining that an application claims to be provided by a publisher and verifying that the claimed publisher provides the application.

At step 402, determination module 106 may analyze package names within an application for a domain name. As noted, many organizations may use their domain name in reverse order as the prefix to the names of packages within their applications. For example, the publisher SYMANTEC may use the package name "com.symantec.mobilesecurity" in a mobile security application, SYMANTEC MOBILE SECURITY. In this example, "SYMANTEC.COM" may be considered as the claimed domain name of SYMANTEC MOBILE SECURITY.

At step 404, determination module 106 may perform static analysis to detect Uniform Resource Locators (URLs) used by an application that are indicative of a domain name claimed by the application. For example, determination module 106 may scan the code of the application to find embedded URLs with the application. In some examples, determination module 106 may, during static analysis, exclude URLs commonly found within applications offered by many different publishers, such as social networking websites, that may not be indicative of a domain claimed by the application. Determination module 106 may use URLs identified by static analysis to identify a domain claimed by an application. For example, determination module 106 may determine that an application with multiple URLs that point to a particular domain is provided by a vendor that owns the particular domain. Determination module 106 may use static analysis independently or in combination with other techniques discussed herein to identify an application's claimed domain. For example, steps 402, 404, and/or 406 may be performed as part of step 306 (determining that an application claims to be provided by a publisher) in FIG. 3.

Additionally or alternatively, verification module 108 may use static analysis to verify that a publisher associated with a domain claimed by an application actually provides the application. For example, after a domain name is identified in a package name, verification module 108 may use static analysis to confirm that the application's use of the domain is consistent with the claimed domain name (e.g., that URLs in the application are used in a manner that would be expected of an application from the domain claimed in the package name). Thus, in some embodiments, step 404 (using static analysis to detect URLs) may be part of step 306 in FIG. 3 (verifying that a claimed publisher provides an application).

At step 406, systems described herein may perform dynamic analysis to detect URLs used by the application. For example, systems described herein may monitor traffic from an application to detect requests made to websites. Applications may make requests to websites for program updates, additional data, and/or social data. Dynamic analysis may exclude commonly occurring URLs (e.g., URLs that may be used in applications from many different application publishers). Commonly occurring URLs may include URLs that point to popular social networking sites, blogs, forums, and/or other frequently-referenced websites.

As with static analysis, determination module 106 may use URLs identified by dynamic analysis to identify a domain claimed by an application. For example, determination module 106 may determine that a URL used by an application to access updates or to which data is transferred may represent a claimed domain of the application. For example, if a game application makes requests to a game publisher's website for additional level packs, high score data, in-game transactions, and/or game patches, determination module 106 may determine that the publisher's domain is the domain claimed by the application. Determination module 106 may use dynamic analysis independently or in combination with other techniques discussed herein to identify an application's claimed domain.

Additionally or alternatively, verification module 108 may use dynamic analysis to verify that a publisher associated with a domain claimed by an application actually provides the application. For example, after a domain name is identified in a package name or through static analysis, verification module 108 may use dynamic analysis to confirm that the application's use of the domain is consistent with the claimed domain name (e.g., that URLs used by the application, excluding commonly-occurring URLs, are directed to the claimed domain). Thus, in some embodiments, step 406 (using dynamic analysis to detect URLs) may be part of step 306 in FIG. 3 (verifying that a claimed publisher provides an application).

Verification module 108 may additionally or alternatively attempt to download an application from a domain claimed by an application to verify that a claimed domain actually provides the application (step 408). In the example of the SYMANTEC MOBILE SECURITY application, a web crawler may crawl the claimed domain "SYMANTEC-.COM" and attempt to download SYMANTEC MOBILE SECURITY from the URL "https://www4.symantec.com/Vrt/offer?a_id=141355." If the application is successfully downloaded, verification module 108 may determine that the application's claimed domain is legitimate. If the application is not successfully downloaded, verification module 108 may determine that the application's claimed domain is not legitimate. Verification module 108 may perform step 408 independently or in combination with any other verification process (e.g., steps 404, 406, and/or 410) to verify that a claimed domain provides an application.

Returning to FIG. 3, at step 310 one or more of the systems described herein may, in response to verifying that the claimed publisher provides the application, maintain an association that indicates that the publisher of the application is authorized to use the key. For example, at step 310 association module 110 may, in response to verifying that publisher 212 provides application 210, maintain an association that indicates that publisher 212 of application 210 is authorized to use key 208.

Systems described herein may maintain an association between the publisher of an application and a key in a variety of ways. For example, association module 110 may create and store an association between a key and a mobile-application publisher in signature-validation database 120. Additionally or alternatively, associate module 110 may maintain an association by verifying that an association that already exists within signature-validation database 120 correctly represents the relationship between the publisher and the key. In one example, association module 110 may store an association between the publisher Orivo and the private key used to sign the application Irate Avians in signature-validation database 120.

In some examples, association module 110 may maintain an association that indicates that the publisher of the application is authorized to use the key by creating or verifying an association between a certificate created by the key and the publisher. Association module 110 may also create or verify an association between a digital signature and the publisher, a digital signature and a domain name owned by the publisher, a certificate created by the key and a domain name owned by the publisher, and/or the application and the publisher.

FIG. 5 is a block diagram of an exemplary system 500 for using a signature validation database to determine whether an application's signature is valid. In some embodiments, the functionality provided by system 500 may be provided within signature-validation system 202. Additionally or alternatively, system 500 may be independent from signature-validation system 202.

System 500 may include a signature-validation system 502, which may include modules 102. Signature-validation system 502 may include identification module 104, which may identify an unverified application 518 that may be signed with a signature 517. Signature-validation system 502 may also include determination module 106, which may determine that unverified application 518 claims to be published by a publisher 520. In addition, signature-validation system 502 may include a query module 510 that may query signature-validation database 120 for information about whether publisher 520 is already associated with the key used to sign unverified application 518.

Signature-validation system 502 may also include verification module 110, which may determine, based on a response from signature-validation database 120, that publisher 520 is not associated with unverified application 518. Signature-validation system 502 may further include a conclusion module 512 that may conclude, based on the determination that publisher 520 is not associated with unverified application 518, that signature 517 of unverified application 518 is not legitimate. Conclusion module 518 may then take security action 522.

Figure 6:
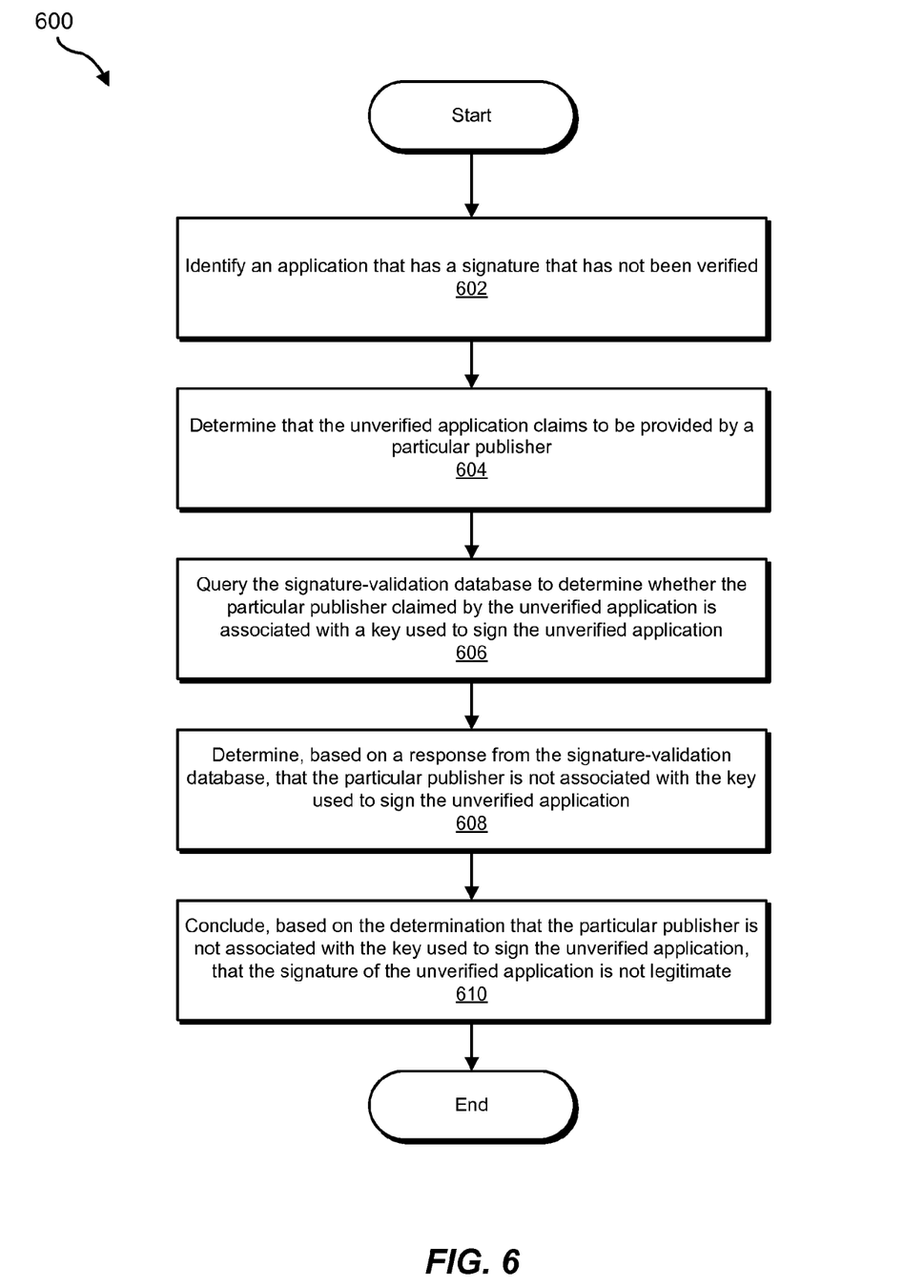
FIG. 6 is a flow diagram of an exemplary method for using a signature-validation database to determine whether an unverified application is legitimate.

FIG. 6 is a flow diagram of an exemplary method 600 for using a signature validation database to determine whether an application's signature is valid. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 710 in FIG. 7, and/or portions of exemplary network architecture 800 in FIG. 8.

At step 602, systems described herein may identify an application that has a signature that has not been verified. For example, identification module 104 may identify unverified application 518 that is signed with signature 517. Identification module 104 may identify an unverified application in a variety of contexts. For example, identification module 104 may identify an unverified application during a process of evaluating each application in an application distribution system. Additionally or alternatively, identification module 104 may identify a new application (e.g., an application recently added to a distribution system) as an unverified application. In one example, identification module 104 may identify an unverified application "Enraged Poultry."

At step 604, systems described herein may determine that the unverified application claims to be provided by a particular publisher. For example, determination module 106 may determine that unverified application 518 claims to be provided by publisher 520. Determination module 106 may determine that an application claims to be provided by a particular publisher using any of the techniques mentioned above in the discussion of step 306. In one example, the security system may determine that Enraged Poultry claims to be provided by the publisher Orivo.

At step 606, systems described herein may query the signature-validation database to determine whether the particular publisher claimed by the unverified application is associated with a key used to sign the unverified application. For example, query module 510 may query signature-validation database 120 to determine whether publisher 520 is associated with a key used to sign unverified application 518. Continuing with the previous example, query module 510 may query a signature-validation database to determine if Orivo is associated with the key used to sign Enraged Poultry.

At step 608, systems described herein may determine, based on a response from the signature-validation database, that the particular publisher is not associated with the key used to sign the unverified application. For example, verification module 110 may determine, based on the response from signature-validation database 120, that publisher 520 is not associated with the key used to sign unverified application 518. In one example, the security system may determine, based on the signature-validation database not containing any stored associations between Orivo and the key used to sign Enraged Poultry, that Orivo is not associated with the key.

At step 610, systems described herein may conclude, based on the determination that the particular publisher is not associated with the key used to sign the unverified application, that the signature of the unverified application is not legitimate. For example, conclusion module 512 may conclude that signature 517 of unverified application 518 is not legitimate. Continuing with the previous example, conclusion module 512 may conclude that the signature of Enraged Poultry does is not associated with Orivo, and thus Enraged Poultry is likely a malicious imposter of the application Irate Avians that is legitimately published by Orivo.

In some examples, systems described herein may, upon concluding that the signature of an unverified application is not legitimate, perform a security action. Examples of a security action include, without limitation, warning a user about the unverified application, blocking a download of the unverified application, lowering a reputation score of the unverified application, removing the unverified application from an application store, and/or deleting the unverified application from a computing device. For example, upon concluding that the signature of Enraged Poultry is not legitimate, systems described herein may remove it from a mobile application store. Additionally or alternatively, the systems described herein may block the download of Enraged Poultry and warn the user of the mobile device that they are attempting to download an imposter application.

As explained above in connection with method 300 in FIG. 3, systems described herein may validate application signatures by maintaining a signature-validation database and checking unverified applications and signatures against data stored within the signature-validation database. Systems described herein may populate the signature-validation database by identifying a key used to sign an application and a publisher that the application claims to be provided by. Systems described herein may verify that the claimed publisher provides the application in any of a number of ways, including identifying a domain name owned by the publisher within the application, downloading the application from a website hosted by the publisher, and/or using reputation data about the application to determine that the application is legitimate.

After verifying that the claimed publisher provides the application, systems described herein may store the association in the signature-validation database. Associations between any or all of the application, the key, the publisher, a certificate of the application and/or a domain name may also be stored in the signature-validation database.

In some examples, systems described herein may use the signature-validation database to determine that the signature of an application is not legitimate. In these examples, systems described herein may take a security action such as warning a user, blocking a download of an application, and/or flagging an application as potentially malicious. By using a signature-validation database to validate application signatures, systems described herein may quickly and accurately verify the legitimacy of unverified applications and protect users from potentially malicious imposter applications.

Figure 7:
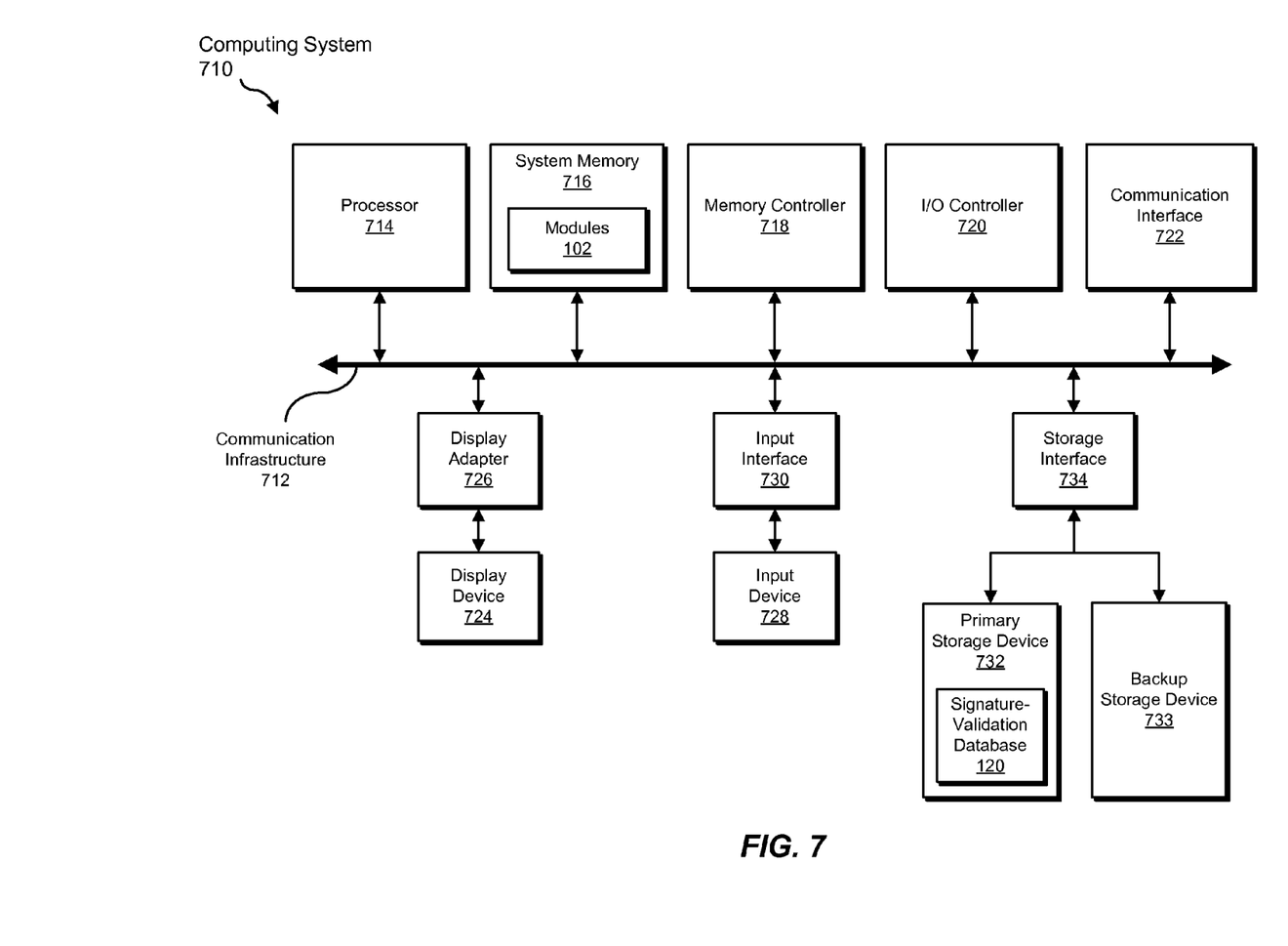
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid-state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, signature-validation database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
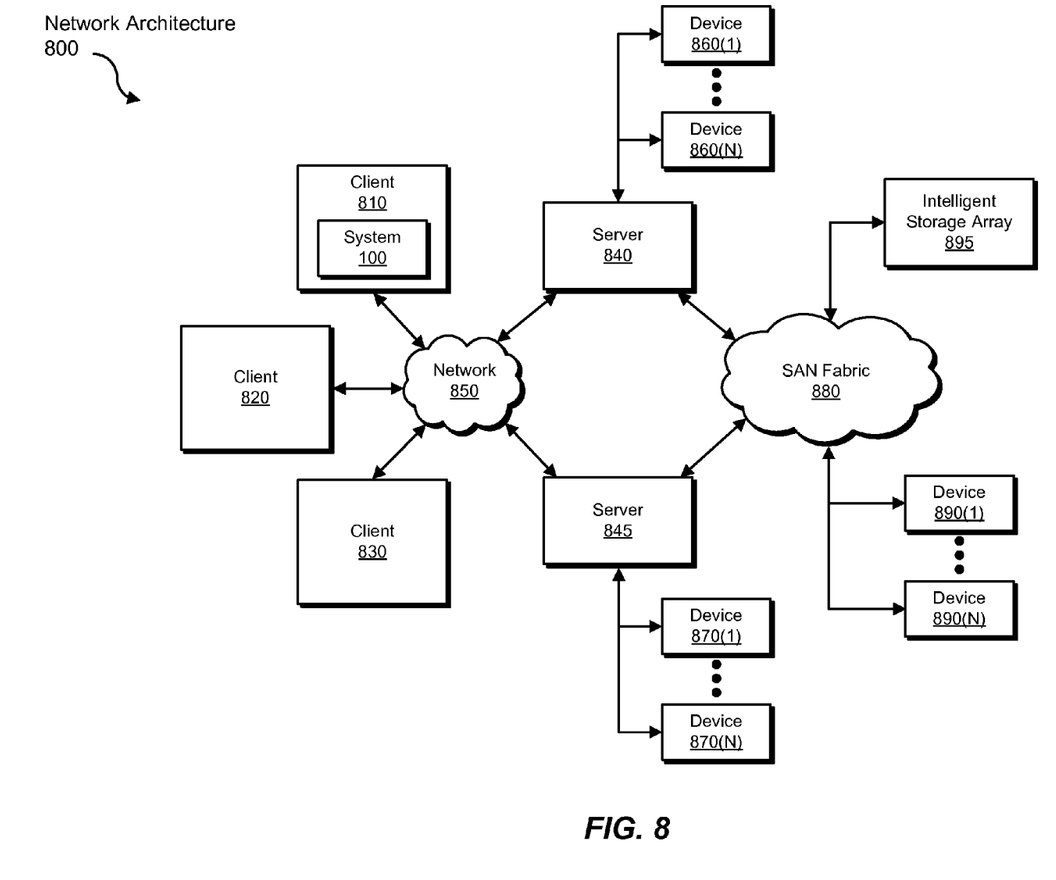
FIG. 8 is a block diagram of an exemplary network architecture capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or signature-validation database servers, configured to provide various signature-validation database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for validating application signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive application data to be transformed, transform the application data, output a result of the transformation to systems described herein, use the result of the transformation to create an association between a key and a publisher, and store the result of the transformation to a signature-validation database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for validating application signatures, at least a portion of the method being performed by a computing device comprising at least one processor, the method comprising:

maintaining a signature-validation database that associates application publishers with signature keys by, for each application in a set of applications:
identifying a key used to sign the application;
determining that the application claims to be provided by a publisher;
verifying that the claimed publisher provides the application;
in response to verifying that the claimed publisher provides the application, maintaining an association that indicates that the publisher of the application is authorized to use the key;

querying the signature-validation database to determine whether a particular publisher claimed by an unverified application is associated with a key used to sign the unverified application;

determining, based on a response from the signature-validation database, that the particular publisher is not associated with the key used to sign the unverified application;

concluding, based on the determination that the particular publisher is not associated with the key used to sign the unverified application, that a signature of the unverified application is not legitimate.

2. The computer-implemented method of claim 1, wherein querying the signature-validation database to determine whether the particular publisher claimed by the unverified application is associated with the key used to sign the unverified application comprises:

identifying the application that has the signature that has not been verified;

determining that the unverified application claims to be provided by the particular publisher.

3. The computer-implemented method of claim 1, further comprising, upon concluding that the signature of the unverified application is not legitimate, performing a security action.

4. The computer-implemented method of claim 1, wherein identifying the key used to sign the application comprises identifying a digital signature that was created with the key.

5. The computer-implemented method of claim 1, wherein determining that the application claims to be provided by the publisher comprises determining that the application appears to claim a domain name owned by the publisher.

6. The computer-implemented method of claim 5, wherein determining that the application appears to claim the domain name comprises identifying the domain name within the application.

7. The computer-implemented method of claim 1, wherein verifying that the claimed publisher provides the application comprises determining that the application is available for download from the publisher.

8. The computer-implemented method of claim 1, wherein verifying that the claimed publisher provides the application comprises determining, based on reputation data of the application that indicates that the application is trusted, that the application is legitimate.

9. The computer-implemented method of claim 1, wherein maintaining the association that indicates that the publisher of the application is authorized to use the key comprises maintaining an association between a certificate created by the key and the publisher.

10. A system for validating application signatures, the system comprising:

an identification module identifies a key used to sign an application;

a determination module that determines that the application claims to be provided by a publisher;

a verification module that verifies that the claimed publisher provides the application;

an association module that, in response to verifying that the claimed publisher provides the application, creates an association that indicates that the publisher of the application is authorized to use the key;

a signature-validation database that stores the association between the publisher of the application and the key;

a querying module that queries the signature-validation database to determine whether a particular publisher claimed by an unverified application is associated with a key used to sign the unverified application;

an association module that determines, based on a response from the signature-validation database, that the particular publisher is not associated with the key used to sign the unverified application;

a conclusion module that concludes, based on the determination that the particular publisher is not associated with the key used to sign the unverified application, that a signature of the unverified application is not legitimate;

at least one processor configured to execute the association module, the identification module, the determination module, the verification module, the querying module, the association module, and the conclusion module.

11. The system of claim 10, wherein the querying module queries the signature-validation database to determine whether the particular publisher claimed by the unverified application is associated with a key used to sign the unverified application by:

identifying the application that has the signature that has not been verified;

determining that the unverified application claims to be provided by the particular publisher.

12. The system of claim 10, further comprising a security module that, upon concluding that the signature of the unverified application is not legitimate, performs a security action.

13. The system of claim 10, wherein the identification module identifies the key used to sign the application by identifying a digital signature that was created with the key.

14. The system of claim 10, wherein the determination module determines that the application claims to be provided by the publisher by determining that the application appears to claim a domain name owned by the publisher.

15. The system of claim 14, wherein the determination module determines that the application appears to claim the domain name by identifying the domain name within the application.

16. The system of claim 10, wherein the verification module verifies that the claimed publisher provides the application by determining that the application is available for download from the publisher.

17. The system of claim 10, wherein the verification module verifies that the claimed publisher provides the application by determining, based on reputation data of the application that indicates that the application is trusted, that the application is legitimate.

18. The system of claim 10, wherein the association module maintains the association that indicates that the publisher of the application is authorized to use the key by maintaining an association between a certificate created by the key and the publisher.

19. A non-transitory computer-readable-storage medium comprising one or more computer-readable instructions that, when executed by at least one processor of a computing device, cause the computing device to:

maintain a signature-validation database that associates application publishers with signature keys by, for each application in a set of applications:

identifying a key used to sign the application;

determining that the application claims to be provided by a publisher;

verifying that the claimed publisher provides the application;

maintaining, in response to verifying that the claimed publisher provides the application, an association that indicates that the publisher of the application is authorized to use the key;

query the signature-validation database to determine whether a particular publisher claimed by an unverified application is associated with a key used to sign the unverified application;
determine, based on a response from the signature-validation database, that the particular publisher is not associated with the key used to sign the unverified application;
conclude, based on the determination that the particular publisher is not associated with the key used to sign the unverified application, that a signature of the unverified application is not legitimate.

20. The non-transitory computer-readable-storage medium of claim 19, wherein the one or more computer-readable instructions, when executed by the processor, cause the computing device to query the signature-validation database to determine whether the particular publisher claimed by the unverified application is associated with the key used to sign the unverified application by:
identifying the application that has the signature that has not been verified;
determining that the unverified application claims to be provided by the particular publisher.

\* \* \* \* \*